United States Patent [19]

Schönwald et al.

[11] 4,172,678
[45] Oct. 30, 1979

[54] FASTENING A ROTOR ON A SHAFT

[75] Inventors: Siegfried Schönwald; Roland Werling; Rudolf Schöning, all of Bad Neustadt, Fed. Rep. of Germany

[73] Assignee: Siemens Aktiengesellschaft, Munich, Fed. Rep. of Germany

[21] Appl. No.: 882,761

[22] Filed: Mar. 2, 1978

[30] Foreign Application Priority Data

Mar. 24, 1977 [DE] Fed. Rep. of Germany ....... 2713034

[51] Int. Cl.$^2$ ................................................ B25G 3/34
[52] U.S. Cl. .................................... 403/267; 403/268; 403/357; 403/365
[58] Field of Search ............... 403/267, 268, 269, 265, 403/357, 365, 15, 31, 34, 37, 372

[56] References Cited

U.S. PATENT DOCUMENTS 3,877,826 4/1975 Shepherd ............................ 403/267

FOREIGN PATENT DOCUMENTS 2057347 2/1972 France ..................................... 403/268
398777 1/1974 U.S.S.R. ................................. 403/372

Primary Examiner—Wayne L. Shedd
Attorney, Agent, or Firm—Kenyon & Kenyon

[57] ABSTRACT

An arrangement for fastening the rotor of a side channel compressor on a shaft wherein the rotor includes a hub through which the shaft passes and the arrangement comprises: a first seating area between the rotor hub and the shaft which is sufficiently tight to provide centering of the rotor on the shaft; a second seating area between the hub and shaft which defines a clearance area therebetween sufficiently wide to receive a hardening plastic; and a hardening plastic disposed within the second seating area.

3 Claims, 1 Drawing Figure

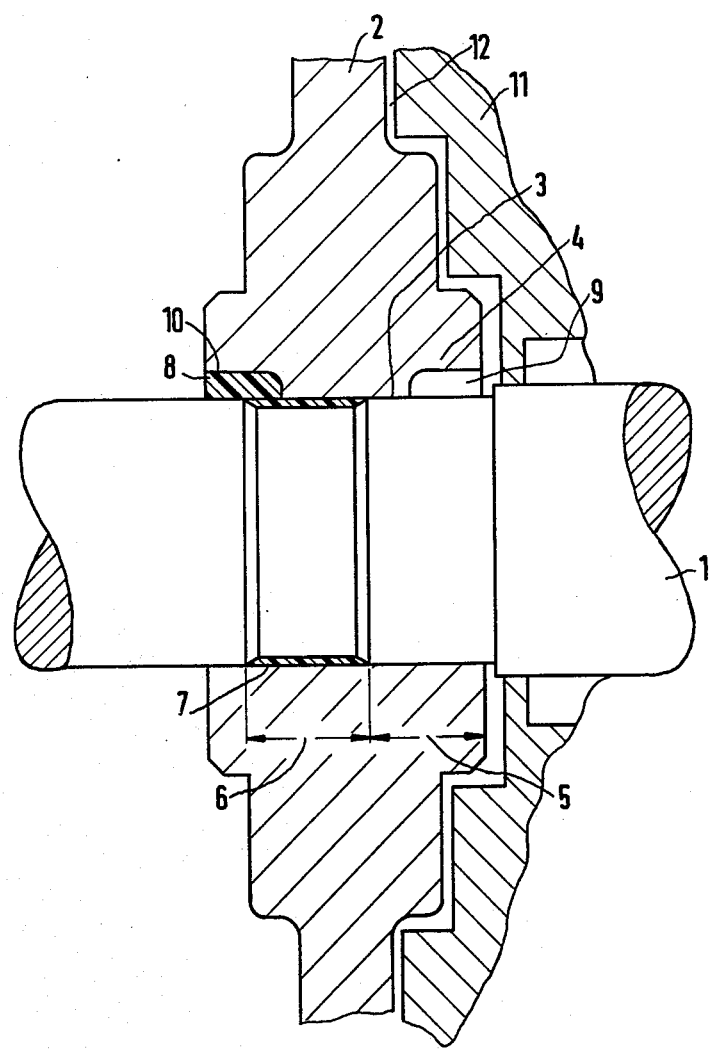

FASTENING A ROTOR ON A SHAFT

BACKGROUND OF THE INVENTION

1. Field of the Invention

The invention relates to an arrangement for fastening a rotor of a side channel compressor to a shaft.

2. Description of the Prior Art

In side channel compressors, the spacing between the rotor and the housing is required to be very small. This requirement stems from the desire, on the one hand, to obtain minimum gap losses and, on the other hand, to obtain cost-effective production. The effort to achieve such small spacings or gaps is particularly great in the case of multistage side channel compressors, since with these compressors the sum of ordinary manufacturing tolerances can easily exceed the permissible position deviation of the rotors.

To avoid excessive gaps between the rotor and housing of side channel compressors, it has been suggested that the rotor be fastened on its respective shaft by means of a hardening plastic. With this kind of fastening, the rotor can first be brought into an optimum position relative to the housing walls of the compressor with little difficulty or effort, and thereafter, it can be fastened to the shaft by means of a hardening plastic which is introduced in the liquid condition between the rotor hub and the shaft.

The drawings of the German Auslegeschrift No. 10 43 540 show the use of a hardening plastic to fasten a permanent magnet forming the rotor of a motor on a shaft. In this known arrangement, a sleeve is provided between the permanent magnet and the shaft and the diameter of the sleeve is made larger than that of the shaft to ensure that a sufficient amount of hardening plastic can be inserted therebetween. Due to the difference in diameters of the sleeve and shaft, however, there is now a danger that the permanent magnet will be fastened on the shaft eccentrically. While this eccentricity may not be important in rotors of small d-c machines, as is the case of this known arrangement, it cannot be tolerated in a rotor of a side channel compressor which rotates at several thousand r.p.m. This known fastening arrangement is thus not directly applicable to the fastening of the rotor of a side channel compressor to a shaft.

Eccentricity between the rotor of a side channel compressor and its shaft can be avoided in a relatively simple manner by arranging the rotor on the shaft with a correspondingly tight seat. If a hardening resin is now introduced between the shaft and rotor, as per the known fastening technique, the tight seat provided results in only a correspondingly thin layer of plastic between the rotor and shaft. It has been found, however, that particularly if the rotor and the shaft are formed of materials with different coefficients of expansion, such a thin layer is torn from the rotor and shaft if the latter are heated up. The layer, therefore, no longer fills the gap which develops between the rotor and shaft due to their different amounts of expansion and there is then no longer a positive, force-transmitting connection between the shaft and rotor.

It is, therefore, an object of the present invention to provide an arrangement for fastening a rotor of a side channel compressor to a shaft in such a manner as to avoid eccentricity of the rotor relative to the shaft, while still realizing a sufficiently strong connection therebetween.

SUMMARY OF THE INVENTION

In accordance with the principles of the present invention, the above and other objectives are realized in an arrangement for fastening the hub of the rotor of a side channel compressor to a shaft passing therethrough by providing a first seating area between the hub and shaft which is sufficiently tight to center the rotor on the shaft and a second seating area between the hub and shaft which defines a clearance area therebetween sufficiently wide to receive a hardening plastic.

With the fastening arrangement so formed, the tight seating area prevents any eccentricity of the rotor relative to the shaft. Moreover, the second seating area with the wide clearance, permits the layer of hardenable plastic to be sufficiently thick so as not to be torn off by the different expansions of the hub and the shaft during operating of the compressor. The tight seating area also prevents eccentric shifting of the rotor due to forces which occur during the setting of the plastic.

Advantageously, the second seating area can be formed by forming the shaft with a reduced diameter portion. Furthermore, with the shaft so formed, the introduction of the hardening plastic into the second seating area can be simplified by providing that the reduced diameter portion be shorter than the axial length of the hub and be within the hub and by further providing the hub with at least one longitudinal slot which extends in the axial direction at least partly beyond the reduced diameter shaft portion. In this case, the second seating area is thus in the form of an annular space formed between the reduced diameter portion and hub, the latter space being capable of being filled with the hardening plastic via the longitudinal slot provided in the hub. Moreover, lateral escape of the plastic from the annular space is prevented to a large degree by the tight seat on both sides of the annular space.

Advantageously, the reduced diameter portion of the shaft can be further arranged asymmetrically to the length of the rotor hub and longitudinal slots can be provided on opposite axial sides of the hub. In this case, the rotor can be reversed on the shaft, so that the side channel compressor can be built without any change for one or the other directions of rotation. Moreover, the axial length of the longitudinal slots can be made so that the longitudinal slot furthest removed from the reduced diameter shaft portion does not extend into such portion. As a result, the plastic is prevented from escaping via this longitudinal slot.

BRIEF DESCRIPTION OF THE DRAWING

The above and other features and aspects of the present invention will become more apparent upon reading the following detailed description in conjunction with the accompanying drawings in which the sole FIGURE shows an arrangement for connecting a rotor of a side channel compressor to a shaft in accordance with the principles of the present invention.

DETAILED DESCRIPTION

In FIG. 1 a rotor 2, illustrated only partially in the drawing, of a side channel compressor is arranged on a shaft 1. The shaft 1 passes through an opening 3 of a hub 4 developed on the rotor 2. Along a first axial region 5, the shaft 1 and opening 3 define a first seating area wherein the outside diameter of the shaft 1 and the inside diameter of the opening 3 are such that a tight seat is obtained being the shaft and hub. Due to this tight seating area, the rotor 2 is centered on the shaft 1. Along a second axial region 6, the shaft 1 and opening 3 define a second seating area wherein outside diameter of the shaft is reduced relative to the inside diameter of the opening 3. In this manner, an annular space 7 is created between the hub 4 and the shaft 1. As can be seen, the length of the second region 6 is chosen so that it does not extend beyond the end of the hub 4. As a result, the annular space 7 is completely closed off. The hub 4 is further provided on opposite axial ends with longitudinal slots 8 and 9, respectively.

In the present illustrative case, the second seating area and, hence, the annular space 7 is shifted to one side relative to the center of the rotor 2. Through this shift and through appropriate selection of the axial lengths of the two longitudinal slots 8 and 9, one longitudinal slot 8 is made to partially overlap the annular space 7. The annular space 7 can thus be filled via the respective longitudinal slot 8 with a hardening plastic.

If the side channel compressor is to be constructed for the opposite direction of rotation, it is merely necessary to mount the rotor 2 on the shaft 1 reversed. In this case, the annular space 7 can be filled via the longitudinal slot 9. In either case, the plastic is prevented from escaping via the opposite respective longitudinal slot.

In assembling the compressor, the rotor 2 is first pushed on the shaft 1. By means of assembly gages, the axial gap 12 between the rotor 2 and the housing 11 of the side channel compressor is then adjusted. Thereafter, liquid plastic 10 is introduced into the annular space 7 via the respective longitudinal slots 8 or 9. After the liquid plastic 10 has set, the rotor 2 is firmly connected to the shaft 1. Moreover, by appropriate selection of the annular space 7 the radial thickness of the plastic 10 will be such that the joint can withstand the stresses that occur due to expansion of the shaft and hub due to heating. With the arrangement of the invention, good eccentricity between the rotor 2 and the shaft 1 is thus achieved without additional assembly aids, as well as a joint which withstands the stresses that occur.

What is claimed is:

1. An arrangement for fastening a rotor of a side channel compressor to a shaft, said rotor having a hub through which said shaft passes, the arrangement comprising:
    at least first and second seating areas between said hub and said shaft, said first seating area being such as to center said rotor on said shaft and said second seating area defining a closed off space between said rotor and said shaft sufficiently wide as to receive a hardening plastic;
    at least one axially extending slot in said hub for introducing a hardening plastic into said space; and
    a hardening plastic in said space.

2. An arrangement in accordance with claim 1 wherein:
    said shaft in the region of said second seating area has a reduced diameter which results in said closed off space.

3. An arrangement in accordance with claim 2 wherein:
    said reduced portion of said shaft is arranged asymmetrically with respect to the length of said hub;
    and said hub has two longitudinal slots extending from opposite axial sides thereof.

* * * * *